April 3, 1956   O. J. PORTER ET AL   2,740,337
OSCILLATING WHEEL AND AXLE ASSEMBLY
Filed March 13, 1950   2 Sheets-Sheet 1

INVENTORS:
Omer James Porter and
BY: Robert S. McKesson,
Pierce, Scheffler & Parker,
Attorneys.

April 3, 1956  O. J. PORTER ET AL  2,740,337
OSCILLATING WHEEL AND AXLE ASSEMBLY
Filed March 13, 1950  2 Sheets-Sheet 2

INVENTORS:
Omer James Porter and
BY: Robert S. McKenon,
Pierce, Scheffler & Parker,
Attorneys.

United States Patent Office 2,740,337
Patented Apr. 3, 1956

2,740,337

OSCILLATING WHEEL AND AXLE ASSEMBLY

Omer James Porter, Fair Oaks, and Robert Smith McKesson, Sacramento, Calif.; said McKesson assignor to said Porter Application March 13, 1950, Serial No. 149,301

3 Claims. (Cl. 94—50)

The present invention relates to an oscillating wheel and axle assembly. More particularly the invention is concerned with an assembly comprising an axle mounted for rotational movement and having two wheel mounting portions about which wheels may rotate independently of the axle, the wheel mounting portions being oppositely and equally eccentric to the axis of the axle whereby the wheels are free to oscillate and thereby share equally in supporting the load carried by the axle.

In copending U. S. Patent application Serial No. 777,763, filed October 3, 1947, now Patent No. 2,624,251, there is disclosed and described a roller type earth compaction apparatus comprising a plurality of closely spaced articulated ballast-carrying load units, supported on a plurality of coaxially aligned closely spaced wheels equipped with high pressure pneumatic tires, each load unit having a pair of wheels carried by a rigid axle which constitutes a structural member of the load unit. The roller compactor described is intended for use at maximum gross weights of approximately 200 tons, whereby with an even distribution of load, a single wheel and tire will be subjected to loads of 50 tons. When the compactor is rolled across an irregular surface the wheels may become burdened with loads greater than 50 tons, but overloading of individual tires is reduced by the oscillating coupling which ties the units together while allowing sufficient flexibility for each unit to adjust itself separately and individually to most normal surface irregularities. Obviously, without this flexibility the additional shock and strain imposed upon the tires when the apparatus is drawn across an uneven surface would result in excessive wear, depreciation and failure of the expensive special-made tires which are necessary for the apparatus. Additionally, whenever any of the wheels of the articulated assembly fails to carry its share of the load, the high intensity stress pattern normally achieved in the sub-soil by virtue of the close wheel spacing is destroyed and the effectiveness of the apparatus in compacting soil to depth is reduced or forfeited altogether.

It is an object of the present invention to provide an axle assembly of sufficient load-distributing ability to permit fabrication of the above described type of roller compactor in the form of a single rigid load unit rather than in the form of an articulated assembly of a plurality of separate, individual load units.

It is a second object to provide an automatic load-distributing axle assembly for a pair of wheels of an apparatus in the general nature of that disclosed in said application Serial No. 777,763 whereby each wheel of a pair normally will carry no more than its share of the load assigned to that pair.

A further object is the provision of an efficient and practical oscillating axle and wheel assembly for any type of multi-wheeled vehicle, particularly those vehicles of a heavy-duty type.

Still another object of the invention is to provide a roller compactor of the ballast-carrying pneumatic-tired type capable of exerting high mass loads at high intensity without over-stressing any of the tires in normal operation.

It is also an object of the invention to provide means in a vehicle equipped with an oscillating wheel and axle assembly whereby the oscillation of said assembly may be prevented when it is desired to have the load borne by only one of the wheels of the assembly, e. g. when one of the tires requires repair or when the equipment is to be moved with light loads or for long distances, or for rolling existing pavement or new subgrade to test single or dual wheel load capacity of an existing pavement or a base before placing final pavement surface.

A number of axle and wheel assemblies which function in accordance with the oscillation principle to provide load distribution have heretofore been proposed. The prior structures, however, are for various reasons not suitable for heavy duty apparatus of the type contemplated by the invention. Principally, these devices are unfit for employment with equipment designed to carry exceptionally heavy loads on closely spaced and substantially coaxially aligned wheels either because their design is too frail and the mechanism too complex to function properly in the heavy equipment, or the mounting means is improper or inadequate for such equipment, or the amount of oscillation is limited to a distance less than the full amount of eccentricity.

It is the purpose of the present invention to overcome the defects of the prior apparatus in these and other respects.

Figure 1:
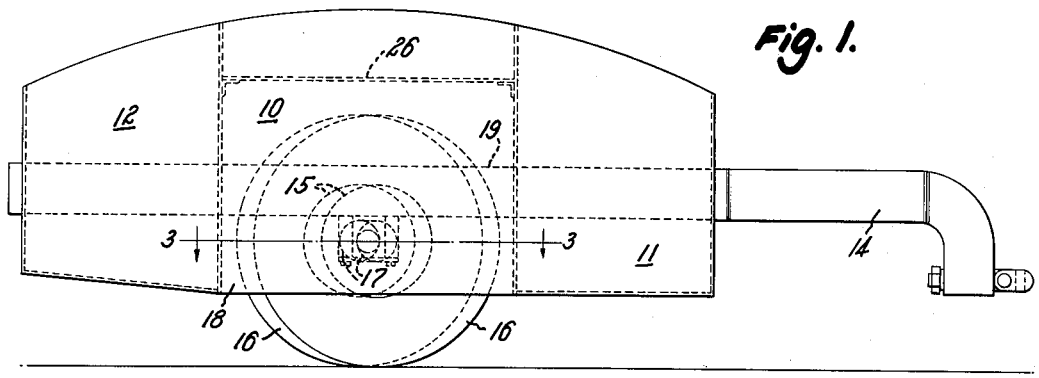
Fig. 1 is a side elevation of a roller compactor provided with an oscillating wheel and axle assembly embodying the invention, and shown resting on an even surface.
Figure 2:
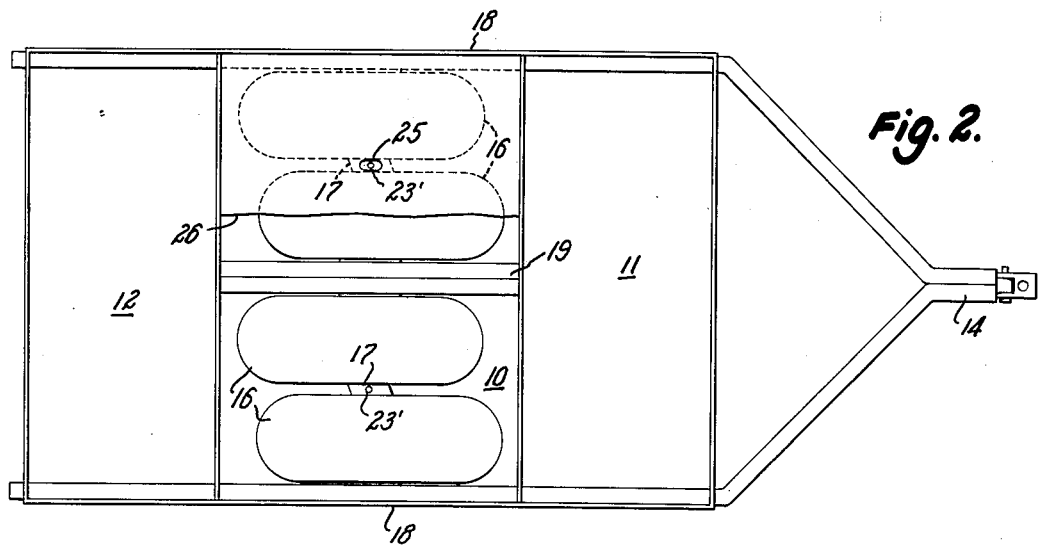
Fig. 2 is a top plan view of the compactor illustrated in Fig. 1, in part cut away to expose the axle and wheel assembly.
Figure 4:
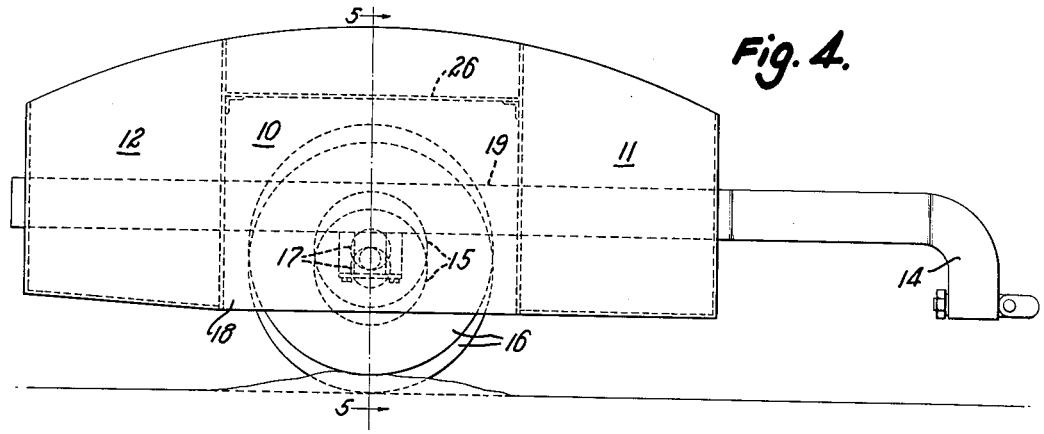
Fig. 4 is a side elevation of a roller compactor of the type shown in Figs. 1 and 2; here illustrated as resting on an uneven surface (full eccentricity)

With reference particularly to Figs. 1, 2 and 4, it will be seen that the illustrated roller compactor embodying the invention has a structural frame providing a wheel housing compartment 10 intermediate two ballast compartments 11 and 12, a drawbar assembly 14 being fastened to the frame whereby the latter is adapted to be towed by a prime mover (not shown).

The design of the structural frame comprises no part of the present invention and may be modified in any manner dictated by convenience. However, the invention finds its maximum utility in a rigid unitary structure suitable for ballast carrying and which is designed for the close spacing of a plurality of wheels which are in general, e. g. approximately but not exactly coaxially aligned.

The structural frame is supported on four wheels 15 equipped with pneumatic tires 16. The wheels are carried by axles 17, each of the wheel axles being carried at its ends by longitudinal frame members 18 and 19 of the roller compactor frame.

Figure 3:
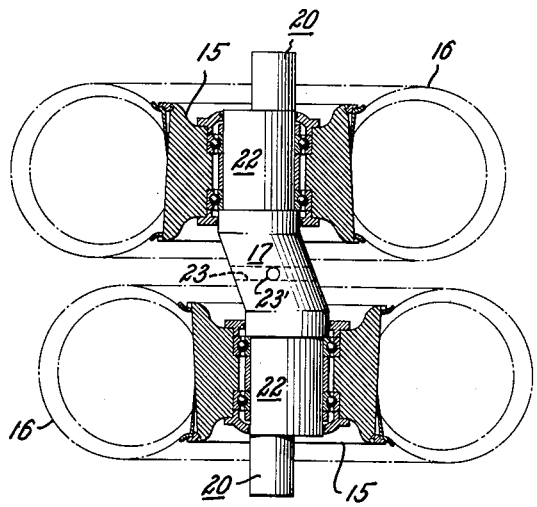
Fig. 3 is an enlarged horizontal section taken on the line 3—3 through one of the axle and wheel assemblies of the roller compactor of Fig. 1.
Figures 5, 6:
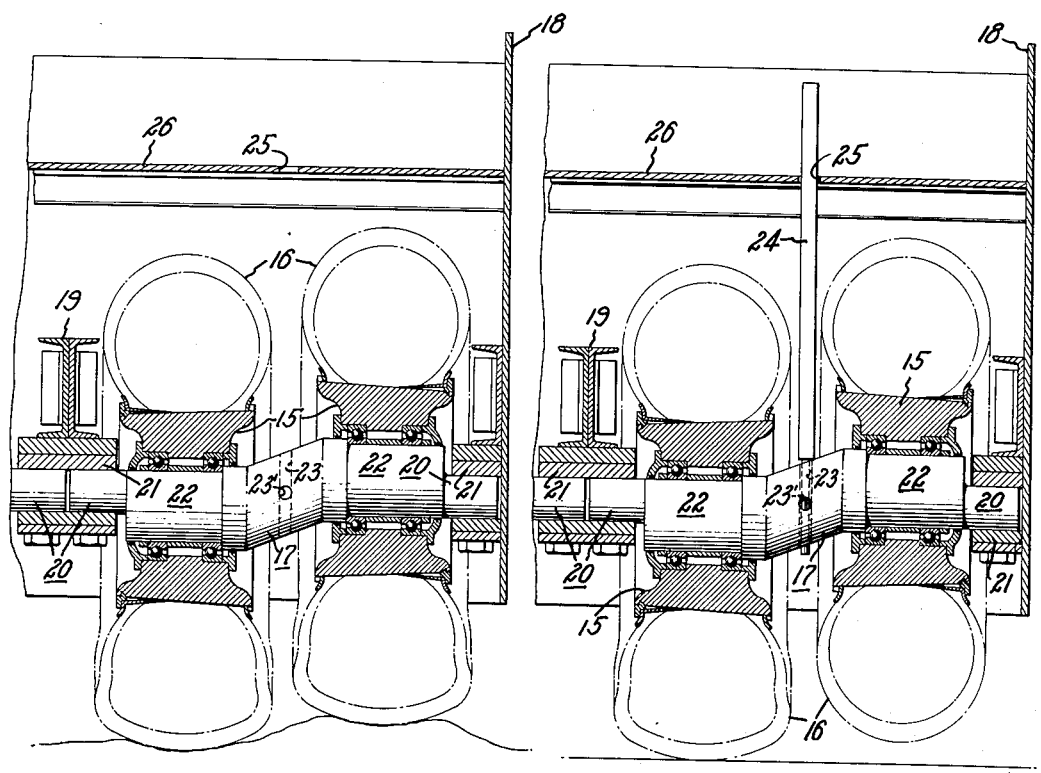
Fig. 5 is an enlarged section on the line 5—5 through a portion of the apparatus of Fig. 4.
Fig. 6 is an enlarged vertical section similar to that of Fig. 5, but showing an oscillation preventing means in its functional position.

A satisfactory arrangement for the wheel and axle mountings is illustrated in more detail in Figs. 3, 5, and 6, by reference to which it will be seen that each axle 17 has coaxially aligned end journal portions 20 journalled for rotation in bearings 21 mounted on the longitudinal frame members 18 and 19. As is evident from Figs. 2 and 6, the two axle sections 17 are arranged in close end-to-end relation so that all four of the wheels 15 are spaced close together along the combined length of the two axle sections between opposite sides 18 of the frame. Also these four wheels constitute the entire support for the compactor load imposed by the ballast loaded into the ballast compartments 11 and 12 and this arrangement thus serves to concentrate the compaction load along substantially a single axis.

Each axle also is formed with two wheel mounting portions 22 intermediate the end journal portions, the wheel mounting portions being substantially equally and substantially oppositely eccentric to the end journal portions, e. g. equally and oppositely off-set from the center line of the axle. It will be noted from Fig. 3 that the inner, adjacent ends of the wheel mounting portions 22 are directly connected through the intermediate portion of the axle section. This not only makes it possible to mount the wheels 15 close to each other but also adds strength to the axle which is designed to carry loads of 50 tons or more. Also in the interest of axial rigidity, it will be noted from the same view that the wheel mounting portions 22 and the portion of the axle 17 therebetween contain the axis through the end journals 20 and therefore provide a continuous rectilinear metallic path from one end journal to the other.

The wheels 15 are mounted by means of bearing assemblies for rotation about the wheel mounting portions 22, the rotation of the wheels therefore being separate from and in addition to the rotation of the axles 17 in their bearings 21. Accordingly, each axle and its wheel pair comprise a unitary oscillating assembly which is capable, within the limit of total eccentricity of the wheel mounting portions, of automatically compensating for irregularities of the surface on which the wheels rest and therefore of automatically distributing evenly between the wheels whatever load is applied to the oscillating assembly.

When the wheels are on an even surface, the condition of each oscillating wheel and axle assembly will be that illustrated in Figs. 1, 2, and 3, e. g. the wheels will be positioned one ahead of the other, the eccentricity of the axle being disposed in a horizontal plane. Upon movement of the roller compactor to an irregular surface which presents an elevated or depressed surface to only one of the wheels of a pair comprising an oscillating axle assembly, the resulting tendency of one of the wheels to assume a greater portion of the weight applied through the axle amounts to a torque exerted on the axle, and the axle being journalled for rotation independent of the wheels will twist in its bearing until the torque becomes neutralized by equal application of force by each wheel. Each wheel oscillates in a single permanent vertical plane perpendicular to the axis of the axle.

Obviously, the principle of equal load distribution is limited in its practical application by the amount of eccentricity with which the axle is formed, and a difference in elevation between the surfaces upon which the two wheels of an axle assembly rest will result in burdening a single wheel with the total load on the axle if that difference is greater than the total amount of eccentricity of the two wheel mounting portions of the axle. Accordingly, the amount of eccentricity to be provided in a particular axle will be dictated by the uses for which the apparatus is contemplated, but when roller compactor equipped with properly proportioned oscilllating wheel and axle assemblies of the invention is put to use, the load applied to an axle normally will be constantly evenly divided between the wheels of the axle with the eccentricity of each axle varying between positions in which all portions of the axle lie in a horizontal plane and positions in which all portions of the axle lie in an almost vertical plane.

The invention finds a particular utility in the embodiment illustrated and described above, since it is especially adapted to meet the problems arising in connection with earth compactors of the type which carry extremely heavy gross loads and which require that the load be applied through a plurality of closely spaced substantially coaxially aligned wheels provided with large high pressure pneumatic tires; however, it is obvious that useful embodiments of the concept of the invention are by no means limited thereto. For instance, the utility of the invention is not limited to apparatus having tires of any particular type, or for that matter, wheels of any particular type. Nor is the invention limited in utility to earth compaction apparatus or to any particular type of vehicle structure or axle or wheel mounting means, and it is believed that the concept disclosed will provide improvement over prior devices in both structure and function when practical applications are made, the invention in its broadest form comprising an axle having coaxially aligned end journal portions and two intermediate wheel bearing portions which are substantially equally and oppositely eccentrically offset from the center line of the axle.

A detail of the axle structure adapted to endow the device with additional utility is illustrated in Figs. 2, 3, 5 and 6, and by reference thereto it will be noted that the axle is provided with a locking pin recess or passage 23 through its center portion perpendicular to its axis. The passage 23 is adapted to receive an end of a locking pin 24 which may be positioned to engage or bear at its other end against some part of the compactor frame such as the edges of an opening 25 in frame member 26 whereby rotation of the axle 17 and consequently oscillation (but not rotation) of the wheels is prevented. It is obvious that there are various other means of locking the axle in a stationary position such as with a large wrench in which case the axle may be provided with flattened surfaces or sections adjacent to a wheel mounting portion, 28; the wrench would best be provided with a jaw adapted to fit the flattened portions of the axle and a handle or lever portion adapted to bear against the frame.

The oscillation prevention means will prove advantageous in a number of situations such as where the compactor or vehicle is to be moved with a flat tire or is to cover long distances on highways empty or with light load. Further, when a compactor is to be employed as a test loading apparatus, the load may be placed on alternate wheels, two outside wheels or two inner wheels, to duplicate heavy pneumatic tired wheel loads at any one of the three possible wheel spacings by placing each of the two axles in the proper fixed position. The axles may be locked in the condition where all four wheels are fixed at the same elevation, this being a condition useful for rolling asphaltic type pavements to seal them up and smooth them to increase their life. For this purpose, a second passage or locking pin recess 23' perpendicular to passage 23 is provided in the axle, and corresponding flat surfaces for wrench gripping are provided if desired.

The invention is not limited to any particular type of locking means, those herein described being preferable merely as a matter of practical convenience, nor is the invention limited to the locking of the axles in any particular position or combination of positions, since it will be obvious that the applications for practical employment of the locked axles will extend to numerous conditions.

An easy method of obtaining the non-oscillating condition of a wheel and axle assembly requires merely that the apparatus be drawn into a position over a surface which is sufficiently elevated under the particular wheel of the pair which it is desired to maintain in the raised position that the other wheel will be suspended with its tire out of contact with a supporting surface. The axle portions then will be lying in a vertical plane, and if the passage 23 also is disposed in this plane of the axle, which is preferable, the locking pin easily may be placed in its operative position.

We claim:

1. In a roller compactor, the combination comprising a frame, coaxially arranged journal bearings carried by said frame, axle means supporting said frame, ballast compartment means carried by said frame and which extend forward and rearward of said axle means, said axle means comprising a pair of axle sections arranged coaxially in close end-to-end relation, each said axle section having coaxial end journals mounted in said journal bearings and being freely oscillatable therein, a pair of cylindrical wheel mounting portions disposed between and substantially equally and oppositely eccentrically offset with respect to the end journals thereof, the adjacent ends of said wheel mounting portions being directly interconnected by an intermediate portion of said axle section, and a pneumatic tired wheel journalled on each of said wheel mounting portions, all of said wheels being closely spaced along the length of said axle means, said wheels and axle sections constituting the entire support for the compaction load imposed by the compactor, and means for selectively locking each of said axle sections against oscillation in said journal bearings such that one eccentrically located wheel mounting portion of each axle section and the wheel journalled thereon are raised to a non-ground engaging position.

2. In a roller compactor, the combination comprising a frame, coaxially arranged journal bearings carried by said frame, axle means supporting said frame, ballast compartment means carried by said frame and which extend forward and rearward of said axle means, said axle means comprising a pair of axle sections arranged coaxially in close end-to-end relation, each said axle section having coaxial end journals mounted in said journal bearings and being freely oscillatable therein, a pair of cylindrical wheel mounting portions disposed between and substantially equally and oppositely eccentrically offset with respect to the end journals thereof, the adjacent ends of said wheel mounting portions being directly interconnected by an intermediate portion of said axle section, and a pneumaic tired wheel journalled on each of said wheel mounting portions, all of said wheels being closely spaced along the length of said axle means, said wheels and axle sections constituting the entire support for the compaction load imposed by the compactor, and means for selectively locking each of said axle sections against oscillation in said journal bearings such that both wheels of each section are fixed at one and the same level with respect to the ground line.

3. In a roller compactor, the combination comprising a frame, coaxially arranged journal bearings carried by said frame, axle means supporting said frame, ballast compartment means carried by said frame and which extend forward and rearward of said axle means, said axle means comprising a pair of axle sections arranged coaxially in close end-to-end relation, each said axle section having coaxial end journals mounted in said journal bearings and being freely oscillatable therein, a pair of cylindrical wheel mounting portions disposed between and substantially equally and oppositely eccentrically offset with respect to the end journals thereof, the adjacent ends of said wheel mounting portions being directly interconnected by an intermediate portion of said axle section, and a pneumatic tired wheel journalled on each of said wheel mounting portions, all of said wheels being closely spaced along the length of said axle means, said wheels and axle sections constituting the entire support for the compaction load imposed by the compactor, and means for locking said wheel mounting portions of each axle sections such that the centers thereeof lie in a vertical plane thereby raising the wheel mounted on the uppermost wheel mounting portion of each axle section out of contact with the ground.

References Cited in the file of this patent

UNITED STATES PATENTS

| | | |
|---|---|---|
| 2,084,983 | Baily | June 29, 1937 |
| 2,172,173 | Peterman | Sept. 5, 1939 |
| 2,199,649 | Poulter | May 7, 1940 |
| 2,244,510 | Anderson | June 3, 1941 |